United States Patent [19]

Nakagiri et al.

[11] Patent Number: 4,960,679
[45] Date of Patent: Oct. 2, 1990

[54] IMAGE FORMING DEVICE

[75] Inventors: Takashi Nakagiri, Tokyo; Yukuo Nishimura, Sagamihara; Kunihiro Sakai, Tokyo; Yoshinori Tomida; Ken Eguchi, both of Yokohama; Kenji Saito, Tokyo, all of Japan

[73] Assignee: Canon Kabushiki Kaisha, Tokyo, Japan

[21] Appl. No.: 462,912

[22] Filed: Jan. 11, 1990

Related U.S. Application Data

[63] Continuation of Ser. No. 823,287, Jan. 28, 1986, abandoned.

[30] Foreign Application Priority Data

| Jan. 31, 1985 | [JP] | Japan | 60-17029 |
| Jan. 31, 1985 | [JP] | Japan | 60-17030 |
| Jan. 31, 1985 | [JP] | Japan | 60-17031 |
| Jan. 31, 1985 | [JP] | Japan | 60-17032 |
| Jan. 31, 1985 | [JP] | Japan | 60-17033 |
| Jan. 31, 1985 | [JP] | Japan | 60-17034 |
| Jan. 31, 1985 | [JP] | Japan | 60-17035 |
| Jan. 31, 1985 | [JP] | Japan | 60-17037 |
| Jan. 31, 1985 | [JP] | Japan | 60-17038 |
| Jan. 31, 1985 | [JP] | Japan | 60-17039 |
| Jan. 31, 1985 | [JP] | Japan | 60-17040 |
| Jan. 31, 1985 | [JP] | Japan | 60-17041 |

[51] Int. Cl.$^5$ .................................. G03C 1/73
[52] U.S. Cl. .................................. 430/335; 430/338; 430/345; 430/349; 430/495; 430/945; 430/962; 430/964; 252/583; 252/586

[58] Field of Search ......... 430/495, 335, 338, 962, 430/349, 345, 944, 964, 945; 252/586, 583

[56] References Cited

U.S. PATENT DOCUMENTS

| 3,322,542 | 5/1967 | Ullman et al. | 430/338 |
| 3,421,894 | 1/1969 | Baum | 430/345 |
| 3,615,481 | 10/1971 | Looney | 430/335 |
| 3,715,212 | 2/1973 | Ross | 430/21 |
| 3,723,121 | 3/1973 | Hauser | 430/962 X |
| 3,887,808 | 6/1975 | VandenHoute et al. | 430/335 |
| 4,237,207 | 12/1980 | Cientrey | 430/335 |
| 4,298,678 | 11/1981 | McKeever | 430/338 |
| 4,347,307 | 8/1982 | Limoges et al. | 430/338 |
| 4,539,061 | 9/1985 | Sagiv | 427/207.1 |
| 4,565,779 | 1/1986 | Arakawa et al. | 430/962 |
| 4,686,169 | 8/1987 | Yoshino et al. | 430/962 X |
| 4,693,962 | 9/1987 | Tamura et al. | 430/345 |

FOREIGN PATENT DOCUMENTS 1176925  8/1986  Japan .................................. 430/495

Primary Examiner—Paul R. Michl
Assistant Examiner—Lee C. Wright
Attorney, Agent, or Firm—Fitzpatrick, Cella, Harper & Scinto

[57] ABSTRACT

An image forming device is provided which comprises an image forming layer containing molecules of an organic compound capable of phase transition, and functional molecules such as those of a photochromic compound. An image forming process is also provided which employs the above-mentioned device.

7 Claims, 3 Drawing Sheets

IMAGE FORMING DEVICE

This application is a continuation of application Ser. No. 823,287 filed Jan. 28, 1986, now abandoned.

BACKGROUND OF THE INVENTION

1. Field of the Invention

The present invention relates to a novel image forming device utilizing thermal energy and optical energy, and in particular to an image forming device having an organic functional film and applicable as a recording device or a display device.

2. Description of the Related Art

There has long been known so-called photo-chromic molecules (for example Sen-i Kobunshi Zairyo Kenkyousho Kenkyu Hokoku No. 141, 1984–3) which are functional molecules which change color in response to the light of a wavelength $\lambda_1$ and return to the original color on storage in a dark place, or in response to heat or light of a wavelength $\lambda_2$.

However, despite having the function of reversible color change, such photochromic molecules has not been utilized in display, recording or memory devices except in very limited fields, because they do not respond or are scarcely responsive to light when in a solid state.

SUMMARY OF THE INVENTION

An object of the present invention is to resolve the problems in such technical field that cannot be resolved in the prior art.

More specifically, an object of the present invention is to provide an image forming device with a high contrast, which can be utilized as a simple recording, display or memory device.

Another object of the present invention is to provide a display device adapted for use in a color display recording apparatus.

According to an aspect of the present invention, there is provided an image forming device, comprising an image forming layer containing both molecules of an organic compound capable of phase transition and functional molecules.

According to another aspect of the present invention, there is provided an image forming device, comprising an image forming layer containing both molecules of an organic compound capable of phase transition and functional molecules, and a heat generating element for providing said image forming layer with thermal energy.

According to a further aspect of the present invention, there is provided an image forming process by heating a device comprising an image forming layer containing both molecules of an organic compound capable of phase transition and functional molecules to render said layer flexible, and simultaneously providing a light signal corresponding to an image signal to said device.

According to a still further aspect of the present invention, there is provided an image forming process which comprises heating a device comprising an image forming layer containing both molecules of an organic compound capable of phase transition and functional molecules to render said layer flexible, and then providing a light signal corresponding to an image signal to said device.

DETAILED DESCRIPTION OF THE PREFERRED EMBODIMENTS

Phase transition mentioned in the present invention means a change of a material by heat from a static solid state to a dynamic state. Consequently the phase transition includes all the changes from a solid state to a fluid or soft state, from a static state to a dynamic state, from crystalline phase to liquid crystalline phase from solid to liquid, and from one crystalline phase to another crystalline phase.

A functional molecule means a molecule with image forming (display, recording and memory) function or information converting (computing) function other than image converting function, further including the function of transporting material or energy. Such function is exhibited not only by the application of light or electric energy but also by the application of heat, magnetic field, pressure to the material.

The basic working principle of the device of the present invention is as follows.

Certain functional molecules rapidly undergo chemical changes in liquid or fluid phase in response to the supply of energy, but such chemical changes either do not occur or are very slow in a solid or rigid state.

For the functional molecule constituting a mixed film together with an organic compound molecule capable of phase transition, there is selected a molecule as mentioned above which does not perform or scarcely performs intended functions due to the lack of difficulty of chemical change in a rigid state but which is capable of performing said function due to the ease of said chemical change in a soft state.

Said mixed membrane, composed as mentioned above, is heated to a temperature exceeding the phase transition point to maintain said organic compound in a flexible state. In such a state, said functional molecule can easily undergo chemical change, and therefore performs the function rapidly in response to an input energy. The objects of the present invention are therefore attained by the above-explained structure.

In summary, the present invention has resolved two problems:

1. that a solid medium is desired since a liquid medium is unstable and limits the field of application; and
2. that the function cannot be performed sufficiently in a solid state: by the incorporation of an organic compound capable of phase transition.

In the following the image forming device of the present invention will be explained in greater detail by embodiments thereof shown in the attached drawings.

Figure 1:
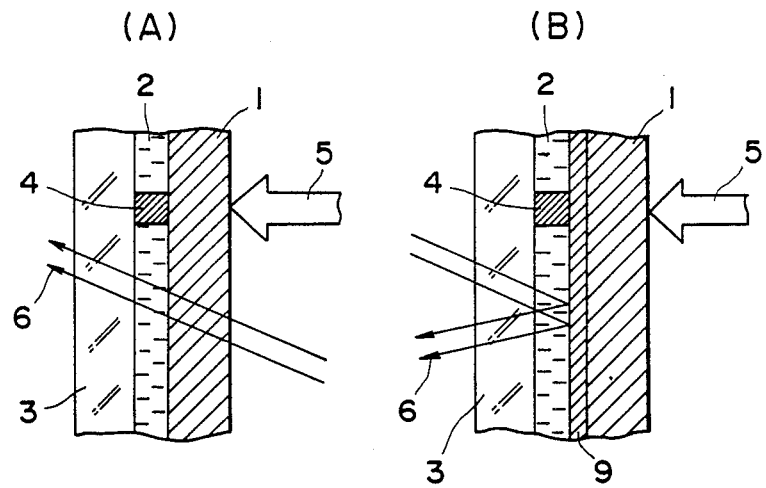
FIGS. 1(A) and 1(B) are respectively cross-sectional views of transmission end reflection types image forming device of the present invention.

FIGS. 1(A) and 1(B) are respectively cross-sectional views of the transmission or reflective type image forming device of the present invention. There are shown a substrate 1, an image forming layer 2 consisting of a mixed film composed of an organic compound capable of phase transition and functional molecules which performs in response to light; and a protective substrate 3.

The transmission image forming device shown in FIG. 1(A) functions in the following manner.

Firstly heat is applied, as a bias for image formation, to the image forming layer 2 to cause a phase change in the organic compound capable of phase transition, constituting said image forming layer 2. Said layer 2, thus rendered flexible or fluidic, is irradiated with light 5 (infrared, visible or ultraviolet light or x-ray) at a desired position, for example 4, according to a certain image pattern or input information, thereby causing a photochemical change, to be explained later, in the functional molecules constituting the image forming layer 2. The pattern of said photochemical change is irradiated, from the back side, with an illuminating light 6 and is displayed or read in a direct or indirect manner.

In the reflective image forming device shown in FIG. 1(B), the illuminating light is introduced from the protective substrate 3 and is reflected by a reflective film 9, provided between the image forming layer 2 and the substrate 1, and the difference in intensity of the reflected light 6 between the photochemically changed area 4 and other area is utilized for information display or reading. In the following there are shown examples of the organic compound capable of phase transition, constituting the above-mentioned image forming layer 2 in the shape forming device of the present invention:

(1) Higher fatty acids:

$CH_2=CH(CH_2)_8COOH$
$CH_2=CH(CH_2)_{15}COOH$
$CH_2=CH(CH_2)_{20}COOH$ $CH_3(CH_2)_{17}CCOOH$
$\phantom{CH_3(CH_2)_{17}}\|$
$\phantom{CH_3(CH_2)_{17}}CH_2$ $CH_3(CH_2)_8C\equiv C-C\equiv C(CH_2)_8COOH$
$CH_3(CH_2)_3CH=CHCH=CHCH=CH(CH_2)_7COOH$
$CH_3(CH_2)_7CH=CH(CH_2)_7COOH$
$CH_3(CH_2)_7CH=CHCOOH$
$CH_3=CH(CH_2)_8COOH$ $CH_3(CH_2)_9C\equiv C-C\equiv C(CH_2)_8COOH$ $CH_3(CH_2)_{11}C\equiv C-C\equiv C(CH_2)_8COOH$ $CH_3(CH_2)_{13}C\equiv C-C\equiv C(CH_2)_8COOH$
$CH_3(CH_2)_{12}COOH$
$CH_3(CH_2)_{14}COOH$
$CH_3(CH_2)_{16}COOH$
$CH_3(CH_2)_{18}COOH$
$CH_3(CH_2)_{10}COOH$ (2) Long-chain dialkyl salts:

*Long-chain dialkyl ammonium salts:

-continued wherein m is an integer from 10 to 30.

*Long-chain alkylsulfonates
*Long-chain dialkylphosphates (3) Phospholipids:

Lecithine
Cephalin
Sphingomyelin
Plasmalogen (4) Cyanine dyes:

Examples of cyanine dyes are listed below:

(5) Azo dyes:

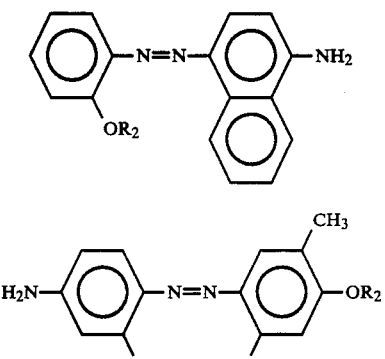
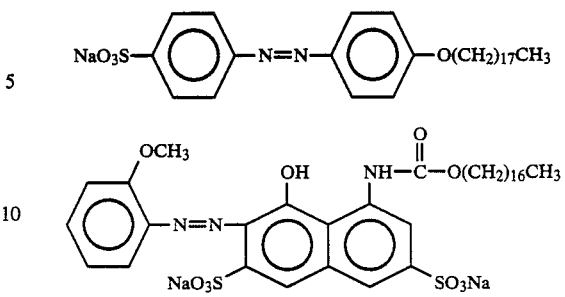
wherein $R_2$ is an alkyl radical with 10 to 30 carbon atoms.
An example of a functional molecule responding to light is so-called photochromic compound which changes color in response to light. Examples of such compound are shown below:
(5) Spiropyrane and analogues:
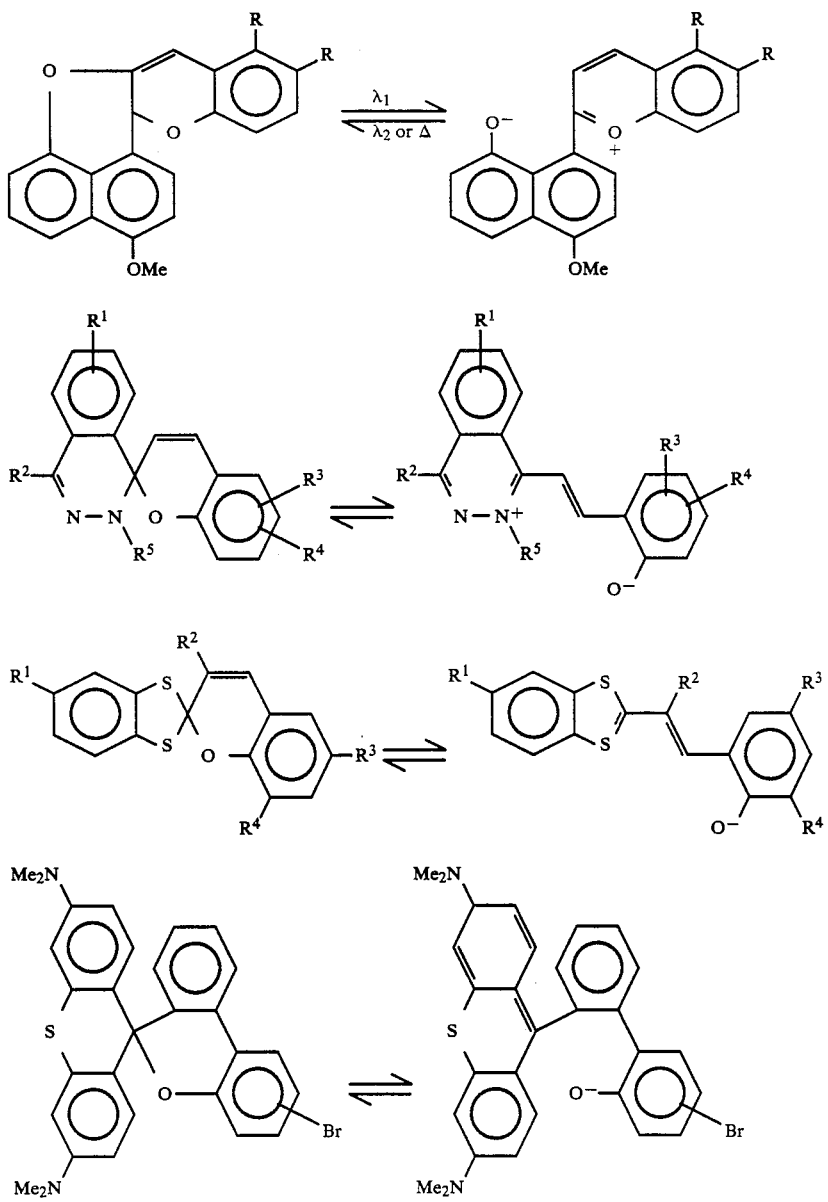

-continued

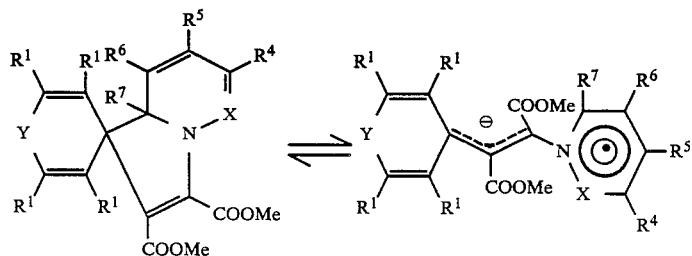

Each compound at left is dissociated, in response to a light of wavelength $\lambda_1$, to an ionized structure at right, which returns to the original structure at left, by heat in a dark place or in response to a light of another wavelength $\lambda_2$.

(7) Cis-trans isomerization:

Examples based on isomerization of an unsaturated double bond such as C=C, C=N or N=N:

*Thioindigo
*Azobenzene

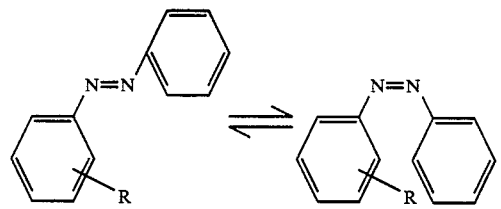

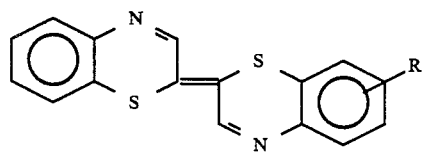

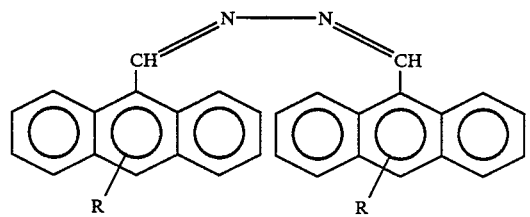

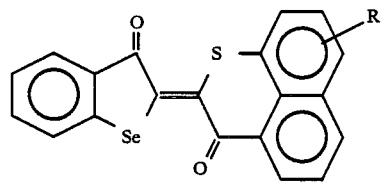

(8) Tautomerism involving hydrogen transfer:
*Keto-enol tautomerism
*Aci-nitro tautomerism

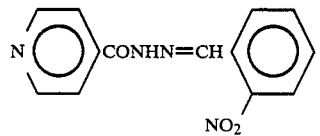

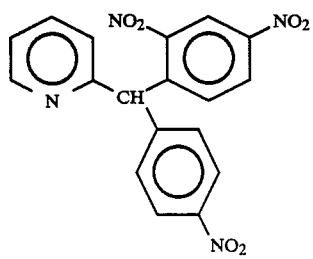
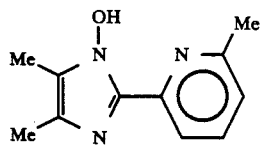
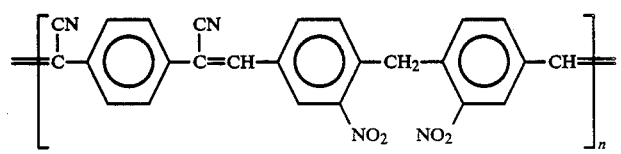
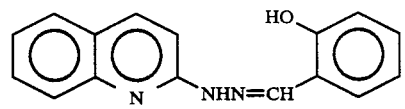
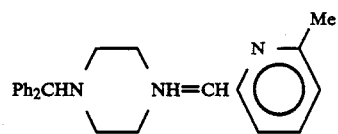
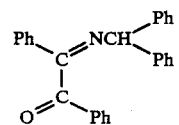
(9) Photocyclization:
*Cis-stilbene
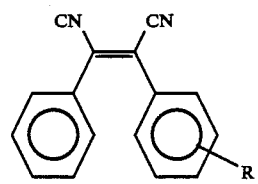
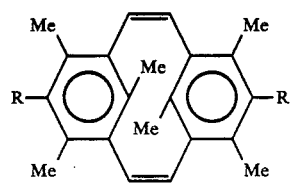

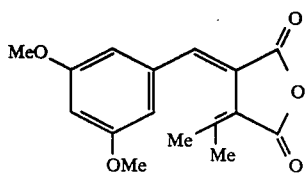

*Fulgides

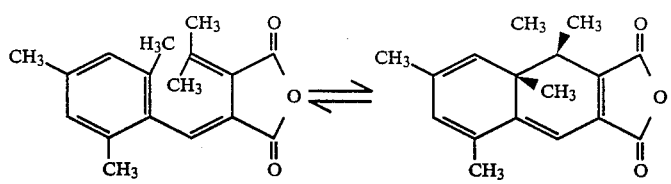

(10) Valence isomerization reaction involving heterocyclic compound:
*Nitron-oxazolidines
(11) 1-phenoxyanthraquinones:
(12) Photodimerization:
(13) Photo-oxygenation to aromatic polycyclic compounds:
(14) Photo-redox reaction:
*Thiazine dyes
*Viologen

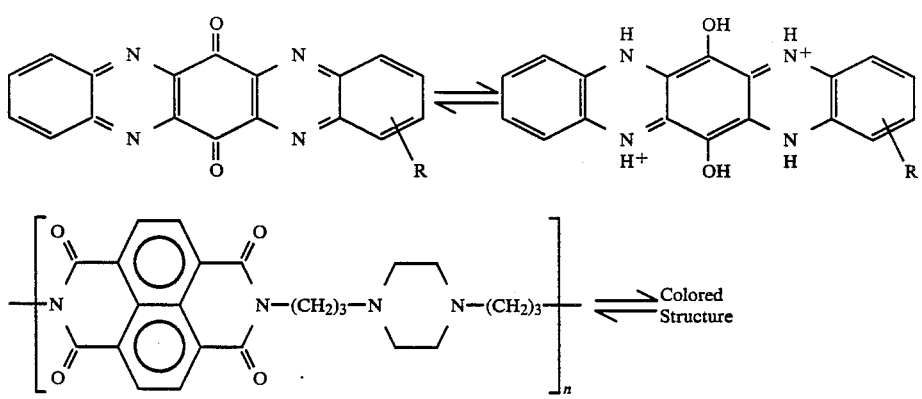

wherein R is a hydrogen atom or a long-chain alkyl radical.

The mixed film of said organic compound capable of phase transition and said functional molecules can be formed for example by spinner coating, roller coating, dip coating, sputtering, plasma polymerization, bimolecular film preparation or Langmuir-Blodgett (LB) process. The objects of the present invention can be attained by any of these methods, but particularly the LB process has the advantages of obtaining high quality and efficiency in image formation, and achieving a high or ultrahigh resolving power. In addition, such process significantly enlarges the range of selection of materials, enabling the formation of a layer of a liquid organic phase-transition compound on a solid.

In the following there will be explained the film formation with the LB process.

The LB process employs a material having a hydrophilic group and an hydrophobic group in a molecule with well-balanced hydrophilicity and hydrophobicity and forms a monomolecular film or a built-up film of monomolecular layers by utilizing the property of such a molecule to form a layer of a monoleculer film on water surface with the hydrophilic group directed downwards. The monolecular layer on water surface has a characteristic of two-dimensional system. When the molecules are scattered sparsely, the area A per molecule and the surface pressure $\pi$ satisfy the equation for two-dimensional ideal gas:

$$\pi A = k T$$

so that the film becomes a "gaseous film", wherein k is Boltzmann's constant and T is absolute temperature. When A is made sufficiently small, the interaction between molecules becomes stronger to obtain a "condensed film (or solid film)" which is a two-dimensional solid. Such a condensed film can be transferred, layer by layer, onto a heat-generating element 7 (FIG. 2) formed on a glass substrate or the like. In this process, a monomolecular film or a monomolecular built-up film can be obtained in the following manner.

At first an organic compound (or a mixture thereof) is dissolved in a solvent, and is spread on water surface to develop a film of said organic compound. A partition plate or a float is provided on the water surface to prevent excessive spreading of said organic compound and to limit the area of spreading, thus controlling the packing state of the organic compound and obtaining a surface pressure $\pi$ corresponding to said packing state. A surface pressure suitable for the preparation of a built-up film can be obtained by moving said partition plate to reduce the area of spreading, thus controlling the packing of said compound and elevating the surface pressure. A monomolecular film or a mixed monomolecular film consisting of a mixture of two or more molecular species can be transferred onto a clean substrate by gently moving said substrate vertically upwards or downwards while maintaining said surface pressure. A film consisting of a desired number of layers of a monomolecular built-up film can be obtained by repeating the above-explained procedure.

For layer formation one or more species of organic molecules are selected from the foregoing list.

The thickness of such monomolecular film or monomolecular built-up film is preferably in a range from 30 Å to 300 μm, particularly from 3000 Å to 30 μm.

Figure 3:
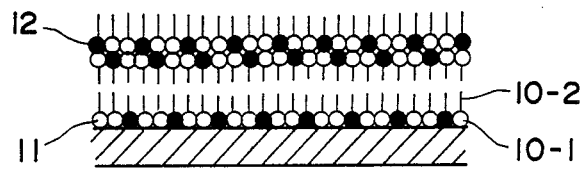
FIG. 3 is a schematic view of superposed monomolecular layers according to the present invention.

The monomolecular layer can be transferred onto the substrate not only by the above-explained vertical dipping method but also by a horizontal lifting method in which the layer is transferred to a horizontally contacting substrate, or by a rotary cylinder method in which a cylindrical substrate is rotated at the water surface to transfer the monomolecular layer thereon. In the aforementioned vertical dipping method, a monomolecular layer in formed on the substrate, with hydrophilic groups directed toward said substrate, by elevating it across the water surface, and a monomolecular layer is added by each downward or upward motion of the substrate. As the direction of molecules in the layer is opposite between the upward motion and downward motion of the substrate, this method provides a Y-type film in which the hydrophilic groups face each other or hydrophobic groups face each other between neighboring layers. FIG. 3 schematically shows a monomolecular built-up film prepared in this manner, wherein shown are hydrophilic radicals or groups 10-1, hydrophobic groups 10-2, molecules of an organic compound capable of phase transition 11, and functional molecules 12.

On the other hand, in the horizontal lifting method in which transfer takes place while the substrate is horizontally contacted with water surface, a monomolecular layer with the hydrophobic groups directed toward the substrate is formed thereon. In this method, by repeating the above-mentioned procedure, there is obtained an X-type film in which the hydrophobic groups face the substrate in all the layers. On the other hand, a built-up film in which the hydrophilic groups are directed toward the substrate in all the layers is called a Z-type film.

In the rotary cylinder method, a cylindrical substrate is rotated on the water surface to transfer the monomolecular layer onto the surface of said substrate. The methods of transferring a monomolecular layer onto a substrate are not limited to those mentioned above. For example, in case of using a substrate of a large area, it can be forwarded into a water tank from a roll of such substrate. Also it is to be noted that the above-mentioned direction of hydrophilic or hydrophobic groups is simply a general rule and may be changed for example by a surface treatment of the substrate.

A long-chain alkyl radical with 5 to 30 carbon atoms is particularly preferable for a hydrophobic group introduced into the functional molecule employed in the present invention.

Examples of the material employable as the substrate are glass, a metal such as aluminum, a plastic material, a ceramic material and paper. In the transmission type shown in FIG. 1(A), there is preferred pressure-resistant translucent glass or plastic, particularly colorless or pale-colored.

For the protective substrate 4, there is preferred pressure-resistant translucent glass or plastic, particularly colorless or pale-colored. The presence of the protective substrate 4 is desirable for improving durability and stability of the mixed layer, but it can be dispensed with by suitable selection of molecules constituting the film.

Figure 2:
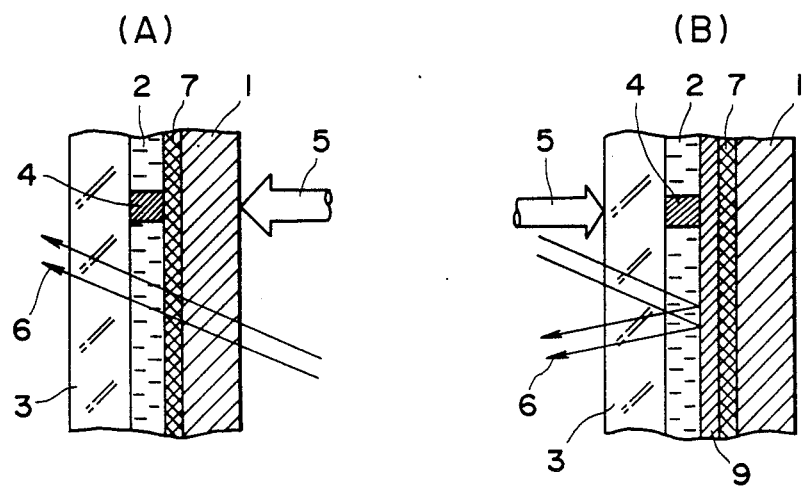
FIGS. 2(A) and 2(B) are cross-sectional views showing another embodiment of the image forming device of the present invention.

A heat generating element 7 may be provided as shown in FIG. 2 in order to effectively supply the image forming layer 2 with thermal energy.

The heat generating element 7 may be an infrared absorbing layer which is heated by infrared irradiation, or a layer of a heat generating resistor which generates Joule's heat. The former can be composed of various inorganic or organic materials, for example an alloy such as Gd·Tb·Fe, an inorganic pigment such as carbon black, or an organic dye such as nigrosine.

Other examples of such light absorbing dyes are metal phthalocyanines such as copper phthalocyanine or vanadium phthalocyanine; metal-containing azo dyes; acid azo dyes; and xanthene dyes such as fluorescein. These dyes should not, however, themselves melt upon receiving heat. On the other hand, the latter can be composed of a metal compound such as hafnium boride or tantalum nitride, or an alloy such as nichrome. The efficiency of energy transmission and resolving power are affected by the thickness of the heat generating element 7. In consideration of this fact, the preferred thickness of the heat generating element 7 is in a range from 1000 to 2000 Å. In the transmission type image forming device, the heat generating element 7 is required to be translucent to the visible light (for example $SiO_2$ film in case of the former, or indium-tin-oxide in case of the latter). However, the heat generating element 7 may also be dispensed with if its function is incorporated in the image forming layer 2 or in the substrate 1 by employing an organic compound, functional molecules or a material for substrate provided with the above-mentioned property.

The reflective film 9 may be composed of a metal layer or a dielectric mirror of a metal or a metal compound of a high melting point, sputtered or vapor-deposited on the substrate 1. The function of said reflective layer may also be incorporated in the substrate by employing a reflective material therein.

In case the reflective film 9 is composed of a conductive material such as metal, an insulating layer composed for example of $TiO_2$ is preferably provided between said reflective film 9 and the heat generating resistive layer.

The phase transition temperature Tc is specific to each material, and is preferably selected between 40 and 100° C. For example, the phase transition temperature of palmitic acid is 60°–63° C., and that of dialkyl ammonium salts is 20°–60° C. In general, the phase transition temperature becomes higher for a longer alkyl chain.

Figure 4:
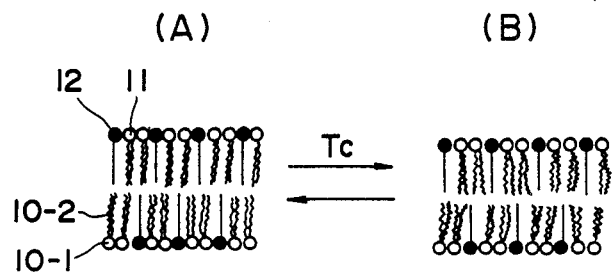
FIGS. 4(A) and 4(B) are schematic views of a thermal phase transition phenomenon of organic molecules in the image forming layer of the present invention.

FIG. 4 schematically illustrates a phase transmission phenomenon of a dialkyl ammonium salt 11 mixed with functional molecules 12.

Weight mixing ratio of the functional molecules (B) to the organic phase transition compound (A) is preferably in a range from 1/10 to 10/1.

The heat generating element 7 is preferably formed as stripes (FIG. 5) corresponding to one or plural scanning lines of the signal light beam or erasing light beam, or as a lattice (not shown). In case of using such heat generating element in stripe or lattice form, the irradiation of the signal light beam 6 onto the image forming layer 2 is preferably conducted synchronously with or slightly later than the heating thereof by the heat generating element 7. In case of stripe-formed element 7, heat is generated in a line-sequential system or a dot-sequential system by means of an unrepresented scanning circuit.

Figure 6:
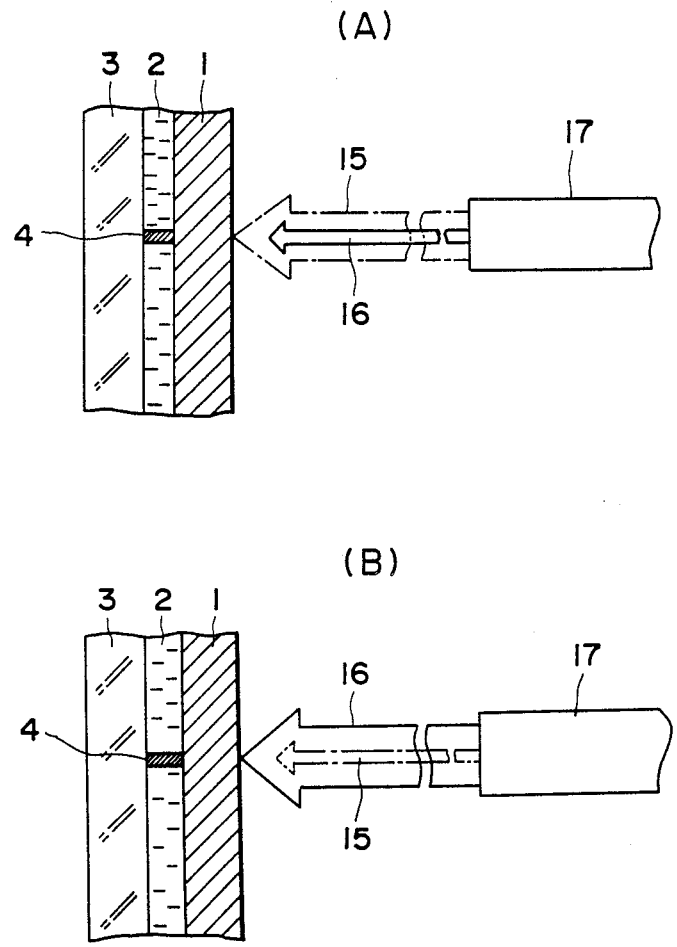
FIGS. 6(A) and 6(B) are schematic views showing an image forming process with a polychromatic light source.

In case of infrared heating (FIG. 6), the use of a polychromatic light source 17 containing infrared light 15 and signal light 16 of a particular wave-length required for photochemical reaction allows to simplify the structure of the device and reduce the manufacturing cost. Energy-saving can also be attained since heating can be limited to an area corresponding to the input signal.

FIGS. 6(A) and 6(B) schematically illustrate image formation with a polychromatic light source 17 containing infrared light 15 and signal light 16. Examples of such light sources covering ultraviolet to infrared region are xenon and other halogen lamps. Naturally there may be employed separate light sources for the infrared light and signal light.

The diameter of the beam spot on said image forming layer is in a range of 0.5 to 100 μm, according to the purpose. The diameters of the spots of infrared light and signal light of various wavelength according to the functional molecule need not be exactly the same on said mixed layer. The spot of the infrared light 15 may be slightly larger than that of the signal light 16 as shown in FIG. 6(A), or may be slightly smaller as shown in FIG. 6(B), because image is formed only in an area irradiated by both kinds of light as explained before. Consequently the size of the image dot is determined by a smaller light spot, as will be seen in FIGS. 6(A) and 6(B). In case of simultaneous irradiation with the infrared light 15 and signal light 16, these two lights may both be irradiated imagewise, or the infrared light 15 alone may be irradiated in plural dots at the same time with plural beams, or the infrared absorbing layer 7 may be scanned with the infrared beam. In the last case the infrared beam preferably precedes the signal light beam. In the foregoing there has been explained image formation by infrared heating, but the present invention can also be modified to replace the infrared absorbing layer 7 with a heat transmission layer composed for example of a metal and to contact a heating element therewith or to bring the same to the vicinity of said heat transmission layer, thereby heating the mixed layer by conduction.

The features of the present invention can be summarized as follows:

(1) An image with a high resolution can be obtained since an image element unit is composed of an irradiated or heated area of a monomolecular film or a monomolecular built-up film and such image element units can be arranged in a high density:
(2) A still picture, or a moving picture, including slow motion picture, can be easily displayed by adjustment or selection of functional molecules:
(3) A color display can be easily obtained by the adjustment or selection of functional molecules:
(4) Relatively simple structure of the device ensures high productivity, durability and reliability;
(5) It is adaptable to a wide range driving methods:
(6) A device of a large are can be easily prepared as the monololecular film or the monomolecular built-up film can be obtained particularly with the Langemuir-Blogett process:
(7) Absence of liquid such as liquid crystal facilitates preparation and ensures safety:
(8) Due to a relatively low phase transition temperature, the image forming device requires only a limited electric power, which allows the power supply and the entire image forming device to be made compact:
(9) A certain mixed film (monomolecular of monomolecular built-up film) maintains the phase transition state for a long period, according to the structure of the molecules constituting said mixed film (built-up film). In such a case, the image forming device of the present invention can also be utilized as a recording device or material, or a memory device or material:
(10) Rapid image formation is possible:
(11) Erasure and reproduction of images are possible.
(12) It is adaptable to molecular devices or bioelectronics since the function is similar to that of biolipids:
(13) A very high thermal efficiency can be obtained in case a heat generating element such as radiation absorbing layer or a heating resistor layer is employed.

The present invention will be further clarified from the following examples. "Part" in the examples is based on weight.

Example 1

Image forming device of the present invention were prepared with the Langmuir-Blogett process in the following manner.

One part of an imidazole of formula (I) and one part of linolenic acid of formula (II):

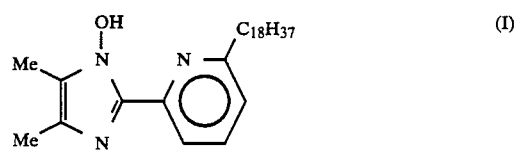

(I)

$CH_3(CH_2CH=CH)_3(CH_2)_7COOH$ (II)

were dissolved in chloroform with respective concentration of $2.5 \times 10^{-3}$ mol/l, and the obtained solution was spread on the surface of distilled water of 20° C. containing cadmium chloride at a concentration of $1 \times 10^{-3}$ mol/l and adjusted to pH 6.3 with sodium bicarbonate.

After the chloroform evaporated off, a partition plate was moved to reduce the area of the mixed monomolecular film remaining on the water surface to elevate the surface pressure to 20 dyn/cm. Then a glass substrate of 50×50 mm was gently moved up and down with a speed of 10 mm/min while maintaining said surface tension, to transfer the monomolecular film onto a face of said glass substrate, thereby obtaining a while image forming layer 2. On said layer there was placed another glass substrate.

In this method there were prepared five image forming devices with white image forming layers respectively containing 21, 51, 101, 201 and 301 monomolecular films.

These image forming devices showed deep purple image when imagewise irradiated with infrared light under direct sunlight. When these devices were stored in a dark place, the images vanished to restore the original white color.

Example 2

Image forming devices of the present invention were prepared by the Langmuir-Blogett process in the following manner.

The process and conditions of the Example 1 were reproduced except that there was employed a solution obtained by dissolving one part of a spiropyrane of formula (III) and a part of elaidic acid of formula (IV) in chloroform in respective concentration of $2.5 \times 10^{-3}$ mol/l, to obtain five image forming devices with colorless image forming layers 2 containing respectively 21, 51, 101, 201 and 301 monomolecular films.

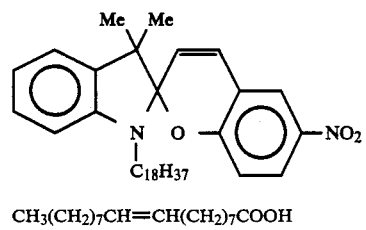

(III)

$CH_3(CH_2)_7CH=CH(CH_2)_7COOH$ (IV)

A xenon lamp was employed as a polychromatic light source for emitting ultraviolet light (356 nm) and infrared light (850 nm).

These image forming devices did not show image formation when irradiated with ultraviolet light alone without infrared light.

On the other hand a clear blue image was obtained in the irradiated area with irradiation of infrared light and a little delayed irradiation of ultraviolet light.

Example 3

Image forming devices of the present invention were prepared with the Langmuir-Blogett process in the following manner.

On a glass substrate of $50 \times 50$ mm an $SiO_2$ layer of 1500 Å was deposited by sputtering to form an infrared absorbing layer 2.

Then the process and conditions of the Example 1 were reproduced except that there was employed a solution obtained by dissolving one part of a cis-trans photoisomerizable compound of formula (V) and a part of a diazo compound of formula (VI):

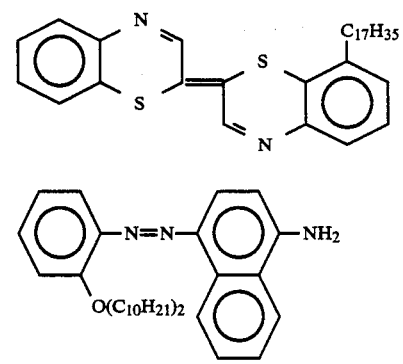

in chloroform in respective concentration of $2.5 \times 10^{-3}$ mol/l, to obtain five image forming devices with yellow image forming layers 2 containing respectively 21, 51, 101, 201 and 301 monomolecular films.

These image forming devices provided red images when irradiated imagewise with infrared light under direct sunlight.

Example 4

An image forming device of the present invention was prepared in the following manner.

One part of a cis-trans photoisomerizable compound of formula (I) and one part of stearic acid of formula (II) were dissolved in 20 parts of chloroform, and the obtained solution was coated with a spinner on a glass substrate of $50 \times 50$ mm to obtain a yellow image forming layer of 4 μm thick. On said layer there was placed a glass protective substrate.

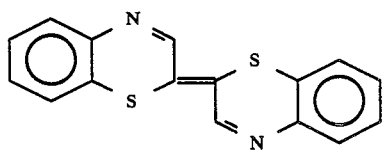

(I)

$CH_3(CH_2)_{16}COOH$ (II)

A red image was obtained when the device was irradiated imagewise with infrared light under direct sunlight.

Example 5

Figure 5:
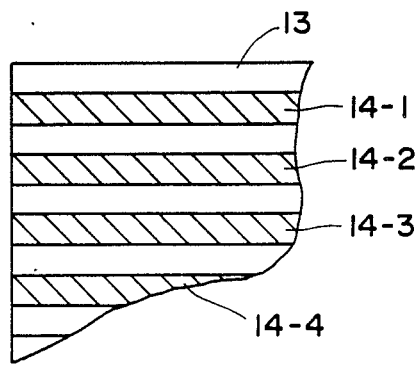
FIG. 5 is a schematic view showing an embodiment of a heat generating resistive layer of the present invention.

An indium-tin-oxide (ITO) film of 1000 Å was sputtered onto a sufficiently cleaned glass substrate 13 shown in FIG. 5. Then a photoresist was coated on said film and exposed to a striped pattern (16 lines/mm) of heat generating resistors. The unnecessary ITO layer was removed by etching to obtain striped heat generating resistors 14-1, 14-2, 14-3, etc. shown in FIG. 5.

Subsequently an image forming layer was formed by the Langmuir-Blogett process on the surface of said resistive layer.

At first one part of an imidazole of formula (I) and one part of lauric acid of formula (II):

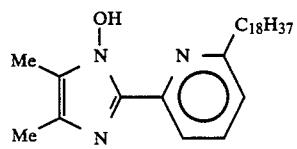

$CH_3(CH_2)_{10}COOH$ (II)

were dissolved in chloroform with a respective concentration of $2.5 \times 10^{-3}$ mol/l, and the obtained solution was dropped and spread on the surface of distilled water of 20° C. containing cadmium chloride at a concentration of $1 \times 10^{-3}$ mol/l and adjusted to pH 6.3 with sodium bicarbonate.

After the chloroform evaporated off, a partition plate was moved to reduce the area of the mixed monomolecular layer remaining on the water surface to elevate the surface pressure to 20 dyn/cm. Then the above-mentioned glass substrate was gently moved up and down with a speed of 10 mm/min while maintaining said surface tension, to transfer the monomolecular layer onto the resistor-bearing surface of said substrate, thereby obtaining a white image forming layer 2. On said layer there was placed another glass substrate. In this manner there were prepared five image forming devices with white image forming layers respectively containing 21, 51, 101, 201 and 301 monomolecular films.

The device containing 51 monomolecular films was subjected to a display test in the following manner. Stripe-shaped resistors 14-1, 14-2, 14-3, ... were respectively connected to external terminals. At first the resistor 14-1 was heated by current for a period of $\tau(\tau \leq 10$ seconds), and simultaneously scanned imagewise with a He-Ne laser beam of a power of 3 mW, wavelength of 633 nm and a spot diameter of 40 μm. This procedure was then repeated on other resistors 14-2, 14-3, etc.

As the result, a deep-magenta image was obtained corresponding to the signal. It was therefore confirmed that the color change took place only in the portion subjected to irradiation under heating. When the device was stored in a dark place, the image vanished to restore the original white color. Similar results were obtained also with four other devices containing different numbers of monomolecular layers.

What we claim:

1. An image-forming device comprising: an image-forming layer formed by the Langmuir-Blodgett process containing a solid organic compound which changes from a solid state to a fluid soft state when heated and a photochromic compound capable of effecting image-formation or information-conversion by undergoing color change when said organic compound is in a fluid or soft state.

2. An image forming device according to claim 1, wherein said organic compound is at least a member selected from higher fatty acids, long-chain dialkyl salts, phospholipids, cyanine dyes, and azo dyes.

3. An image forming device according to claim 1, wherein the thickness of said image forming layer is in a range from 30 Å to 300 μm.

4. An image-forming device according to claim 1 further comprising a heat generating element for providing said image-forming layer with thermal energy.

5. An image forming device according to claim 4, wherein said heat generating element is a radiation absorbing layer.

6. An image forming device according to claim 4, wherein said heat generating element is a heat generating resistive layer.

7. An image forming device according to claim 4, wherein the thickness of said heat generating element is in a range from 1000 to 2000 Å.

* * * * *

UNITED STATES PATENT AND TRADEMARK OFFICE
CERTIFICATE OF CORRECTION

PATENT NO. : 4,960,679

DATED : October 2, 1990

INVENTOR(S) : TAKASHI NAKAGIRI, ET AL.　　　　Page 1 of 2

It is certified that error appears in the above-identified patent and that said Letters Patent is hereby corrected as shown below:

ON TITLE PAGE:
IN [56] REFERENCES CITED

U.S. PATENT DOCUMENTS, "Hauser" should read --Hauser et al.--; "VandenHoute et al." should read --Van den Houte et al.--; "Cientrey" should read --Ceintrey--.

FOREIGN PATENT DOCUMENTS, "1176925　8/1986　Japan" should read --61-176925　8/1986　Japan--.

COLUMN 2

Line 4, "end" should read --and--.
    Line 28, "phase" (second occurrence) should read --phase,--.
    Line 50, "of" (first occurrence) should read --or--.
    Line 67, "state:" should read --state--.

COLUMN 7

Line 16, "alight" should read --a light--.

COLUMN 11

Line 65, "monoleculer" should read --monomolecular--.
    Line 67, "monolecular" should read --monomolecular--.

COLUMN 13

Line 25, "in" should read --is--.

UNITED STATES PATENT AND TRADEMARK OFFICE
CERTIFICATE OF CORRECTION

PATENT NO. : 4,960,679

DATED : October 2, 1990

INVENTOR(S) : TAKASHI NAKAGIRI, ET AL.

Page 2 of 2

It is certified that error appears in the above-identified patent and that said Letters Patent is hereby corrected as shown below:

COLUMN 15

Line 65, "are" should read --area--.

COLUMN 17

Line 38, "Blogett" should read --Blodgett--.

COLUMN 19

Line 20, "claim:" should read --claim is:--.

Signed and Sealed this

Thirty-first Day of March, 1992

Attest:

HARRY F. MANBECK, JR.

Attesting Officer

Commissioner of Patents and Trademarks